United States Patent [19]

Burroway

[11] Patent Number: 5,278,263

[45] Date of Patent: Jan. 11, 1994

[54] SYNDIOTACTIC 1,2-POLYBUTADIENE SYNTHESIS IN AN AQUEOUS MEDIUM UTILIZING N,N-DIBUTYLFORMAMIDE AS A MODIFIER

[75] Inventor: Gary L. Burroway, Doylestown, Ohio

[73] Assignee: The Goodyear Tire & Rubber Company, Akron, Ohio

[21] Appl. No.: 956,215

[22] Filed: Oct. 5, 1992

[51] Int. Cl.$^5$ .............................. C08F 4/609; C08F 2/16
[52] U.S. Cl. ........................................ 526/94; 526/91; 526/93; 526/140; 526/141; 526/220; 526/340.1; 526/903; 502/108; 502/111; 502/117
[58] Field of Search ............... 526/91, 93, 94, 140, 526/142, 141, 220, 340.1, 903; 524/726; 502/108, 111, 124, 122, 117

[56] References Cited

U.S. PATENT DOCUMENTS

| | | | |
|---|---|---|---|
| 3,778,424 | 12/1973 | Sugiura et al. | 260/94.3 |
| 3,901,868 | 8/1975 | Ueno et al. | 526/142 X |
| 4,153,767 | 5/1979 | Ueno et al. | 526/141 |
| 4,429,085 | 1/1984 | Henderson et al. | 526/92 |
| 4,751,275 | 6/1988 | Witte et al. | 526/139 |
| 4,902,741 | 2/1990 | Burroway et al. | 526/93 X |
| 5,011,896 | 4/1991 | Bell et al. | 526/92 |
| 5,021,381 | 6/1991 | Burroway et al. | 502/117 |

*Primary Examiner*—Fred Teskin
*Attorney, Agent, or Firm*—Alvin T. Rockhill

[57] ABSTRACT

Pure syndiotactic 1,2-polybutadiene is a thermoplastic resin which has double bonds attached in an alternating fashion to its polymeric backbone. Films, fibers and molded articles can be made utilizing syndiotactic 1,2-polybutadiene. It can also be blended into rubbers and cocured therewith. Syndiotactic 1,2-polybutadiene can be made by solution, emulsion or suspension polymerization. It typically has a melting point which is within the range of about 195° C. to about 215° C. However, it is often desirable for the syndiotactic 1,2-polybutadiene to have a melting point of less than about 195° C. This invention discloses a process for preparing syndiotactic 1,2-polybutadiene having a melting point of less than about 195° C. which comprises: polymerizing 1,3-butadiene monomer in an aqueous medium in the presence of (1) a catalyst composition which is made by reacting (a) at least one cobalt compound (b) at least one organoaluminum compound, and (c) at least one conjugated diene; (2) carbon disulfide; and (3) N,N-dibutylformamide. This invention further discloses that catalyst emulsion compositions made utilizing amino acid soaps, such as sodium lauroyl sarcosinate, have much better stability than those made with standard surfactants.

14 Claims, No Drawings

SYNDIOTACTIC 1,2-POLYBUTADIENE SYNTHESIS IN AN AQUEOUS MEDIUM UTILIZING N,N-DIBUTYLFORMAMIDE AS A MODIFIER

BACKGROUND OF THE INVENTION

Syndiotactic 1,2-polybutadiene (SPBD) is a thermoplastic resin which can be utilized in making films, fibers and molded articles. For example, U.S. Pat. Nos. 4,394,473 and 4,957,970 disclose the use of SPBD in making bags and packaging. It can also be blended into elastomers, such as polydiene rubbers. Because SPBD contains double bonds which are attached in an alternating fashion to its backbone, it can be cocured with the rubbers in such blends. In fact, SPBD/rubber blends provide a unique combination of properties which make them useful in various tire compounds.

U.S. Pat. No. 4,790,365 discloses that incorporation of SPBD into rubber compositions which are utilized in the supporting carcass or innerliner of tires greatly improves the green strength of those compositions. Electron beam precure (microwave precure) is a technique which has gained wide commercial acceptance as a means of improving the green strength of synthetic elastomers which are used in building tires. However, electron beam precure techniques are costly. The incorporation of SPBD into blends of such synthetic elastomers can often improve green strength to the degree that electron beam precure is not required. The incorporation of SPBD into halogenated butyl rubbers which are utilized as the innerliner compositions for tires also greatly improves the scorch safety of such compositions. U.S. Pat. No. 4,274,462 disclosed that pneumatic tires having improved resistance against heat build-up can be prepared by utilizing SPBD fibers in their tread base rubber.

According to U.S. Pat. No. 4,790,365, the SPBD utilized in making the supporting carcass for tires has a melting point which is within the range of 120° C. to 190° C. and that it is preferred for the SPBD utilized in making the supporting carcass to have a melting point which is within the range of 150° C. to 165° C. The SPBD utilized in making tire innerliners has a melting point which is within the range of 120° C. to 160° C. and preferably has a melting point which is within the range of 125° C. to 150° C. The melting points referred to herein are minimum endotherm values determined from DSC (differential scanning calorimetry) curves.

Techniques for preparing SPBD by polymerizing 1,3-butadiene monomer are well known in the art. These techniques include solution polymerization, suspension polymerization and emulsion polymerization. The SPBD made utilizing these techniques typically have a melting point within the range of about 195° C. to about 215° C. It is accordingly necessary to reduce the melting point of the SPBD to render it suitable for utilization in some applications.

A process is disclosed in U.S. Pat. No. 3,778,424 for the preparation of syndiotactic 1,2-polybutadiene which comprises polymerizing 1,3-butadiene in an organic solvent in the presence of a catalyst composition composed of:

(a) a cobalt compound,
(b) an organoaluminum compound of the formula $AlR_3$, in which R is a hydrocarbon radical of 1-6 carbons, and
(c) carbon disulfide.

U.S. Pat. No. 3,901,868 reveals a process for producing a butadiene polymer consisting essentially of syndiotactic 1,2-polybutadiene by the successive steps of:

(a) preparing a catalyst component solution by dissolving, in an inert organic solvent containing 1,3-butadiene, a cobalt compound, soluble in the organic solvent, such as (i) cobalt-$\beta$-diketone complex, (ii) cobalt-$\beta$-keto acid ester complex, (iii) cobalt salt of organic carboxylic acid, and (iv) halogenated cobalt-ligand compound complex, and an organoaluminum compound,
(b) preparing a catalyst composition by mixing the catalyst component solution (prepared in step a) with an alcohol, ketone or aldehyde compound and carbon disulfide,
(c) providing a polymerization mixture containing desired amounts of 1,3-butadiene, the catalyst composition and an inert organic solvent, and
(d) polymerizing 1,3-butadiene at a temperature which is within the range of $-20°$ C. to $90°$ C.

U.S. Pat. No. 3,901,868 indicates that the melting point of the SPBD produced varies in response to the proportion of alcohol, ketone or aldehyde in the polymerization mixture. U.S. Pat. No. 4,153,767 shows that amide compounds, such as N,N-dimethylformamide, can be used in solution polymerizations to reduce the melting point of SPBD being synthesized.

U.S. Pat. No. 4,429,085 discloses a process for producing syndiotactic 1,2-polybutadiene by suspension polymerization in an aqueous medium. In this aqueous polymerization process polybutadiene which has an essentially syndiotactic 1,2-microstructure is made by the steps of:

(A) preparing a catalyst component solution by dissolving, in an inert organic solvent containing 1,3-butadiene (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$, wherein R represents a hydrocarbon radical of 1 to 6 carbon atoms;
(B) preparing a reaction mixture by mixing said catalyst component solution with a 1,3-butadiene/water mixture containing desired amounts of said 1,3-butadiene;
(C) preparing a polymerization mixture by mixing carbon disulfide throughout said reaction mixture, and
(D) polymerizing said 1,3-butadiene in said polymerization mixture into polybutadiene while agitating said polymerization mixture.

U.S. Pat. No. 4,751,275 discloses a process for the preparation of SPBD by the solution polymerization of 1,3-butadiene in a hydrocarbon polymerization medium, such as benzene, toluene, cyclohexane, or n-hexane. The catalyst system used in this solution polymerization contains a chromium-III compound which is soluble in hydrocarbons, a trialkylaluminum compound, and a dialkylphosphite, such as di-neopentylphosphite or di-butylphosphite.

U.S. Pat. Nos. 4,902,741 and 5,021,381 discloses a process for preparing a syndiotactic 1,2-polybutadiene latex by emulsion polymerization which comprises polymerizing 1,3-butadiene monomer in an aqueous reaction mixture which is comprised of (1) water, (2) at least one emulsifier, (3) 1,3-butadiene monomer, (4) a catalyst emulsion composition which is prepared by dissolving in an inert organic solvent containing at least one polyene (a) at least one cobalt compound selected from the group consisting of (i) β-ketone complexes of cobalt, (ii) β-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$ wherein R represents a hydrocarbon radical of 1 to 6 carbon atoms to produce a catalyst component solution, and microfluidizing the catalyst component solution with an oil, a surfactant, and water to an average particle size which is within the range of about 10 nanometers to about 1000 nanometers; and (5) at least one member selected from the group consisting of carbon disulfide and phenyl isothiocyanate.

The synthesis of SPBD is an aqueous medium offers several important advantages over solution polymerizations. Water, as a medium in which to carry out such a polymerization, is less expensive, more easily purified, less sensitive to oxygen, and has a higher heat capacity. Conducting such polymerizations in an aqueous medium also permits for higher monomer and higher solids concentrations because of the lower viscosity of a polymer suspension or emulsion compared with that of a polymer solution. The main drawback associated with aqueous suspension and emulsion polymerizations for producing SPBD is the difficulty associated with reducing the melting point of the SPBD. In other words, it is difficult to control the chemical structure and hence the crystallinity and melting point of SPBD which is synthesized in an aqueous medium. Even though numerous modifiers can be used to reduce the level of crystallinity and resulting melting point of SPBD which is synthesized in solution, there are few efficient modifiers for reducing the crystallinity of SPBD which is synthesized in an aqueous medium.

U.S. Pat. No. 5,011,896 discloses the use of 4-(alkylamino)benzaldehydes, 4-(dialkylamino)benzaldehydes, 2,4-di-(alkoxy)benzaldehydes, 2,6-di-(alkoxy)benzaldehydes, 2,4,6-tri-(alkoxy)benzaldehydes, and 4-(1-azacycloalkyl)benzaldehydes, and 4-(1-azacycloalkyl)benzaldehydes as modifiers for reducing the melting point of SPBD which is synthesized in an aqueous medium. Nevertheless, there is still a need for more highly efficient modifiers which can be used on a commercial basis.

SUMMARY OF THE INVENTION

It has been unexpectedly found that N,N-dibutylformamide can be utilized to reduce the level of crystallinity of SPBD which is synthesized in an aqueous medium in its presence. By reducing the level of crystallinity in the SPBD, its melting point is accordingly reduced. Thus, N,N-dibutylformamide can be utilized as a modifier for reducing the melting point of SPBD which is prepared by aqueous suspension polymerization or emulsion polymerization in their presence.

This invention more specifically discloses a process for preparing syndiotactic 1,2-polybutadiene having a melting point of less than about 195° C. which comprises: polymerizing 1,3-butadiene monomer in an aqueous medium in the presence of (1) a catalyst composition which is made by reacting (a) at least one cobalt compound selected from the group consisting of (i) β-diketone complexes of cobalt, (ii) β-keto acid ester complexes of cobalt, (iii) cobalt salts or organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, (b) at least one organoaluminum compound of the formula $AlR_3$, wherein R represents a hydrocarbon radical of 1 to 6 carbon atoms, and (c) at least one conjugated diene; (2) carbon disulfide; and (3) N,N-dibutylformamide.

This invention further discloses a process for preparing a catalyst emulsion composition which is particularly useful in the synthesis of syndiotactic 1,2-polybutadiene by emulsion polymerization which is comprised of the steps of (1) preparing a catalyst component solution by dissolving at least one cobalt compound and at least one organoaluminum compound in an inert organic solvent containing at least one conjugated diene and (2) microfluidizing or microemulsifying the catalyst component solution with an oil, an amino acid soap and water.

DETAILED DESCRIPTION OF THE INVENTION

The SPBD made in accordance with the techniques of this invention normally has more than about 70% of its monomeric units in a syndiotactic 1,2-configuration. In most cases, the SPBD made by the process of this invention will have from about 75% to about 95% of its monomeric units in a syndiotactic 1,2-configuration.

In practicing this invention, SPBD is synthesized utilizing aqueous suspension polymerization techniques or emulsion polymerization techniques. The catalyst system and general procedure needed for polymerizing 1,3-butadiene monomer into SPED is described in U.S. Pat. No. 4,429,085. Such suspension polymerization techniques can be utilized in practicing this invention and the teachings of U.S. Pat. No. 4,429,085 are incorporated herein by reference in their entirety. A useful technique for preparing SPBD by emulsion polymerization is described in U.S. Pat. Nos. 4,902,741 and 5,021,381. The emulsion polymerization procedures described therein can be utilized in the practice of this invention and the teachings of U.S. Pat. Nos. 4,902,741 and 5,021,381 are accordingly incorporated herein by reference in their entirety.

In practicing this invention, 1,3-butadiene monomer is polymerized in an aqueous medium by suspension or emulsion polymerization techniques in the presence of N,N-dibutylformamide which acts as a modifier to reduce the level of crystallinity in the SPBD produced. The melting point of SPBD is generally a reflection of the degree of crystallinity in the polymer. The higher the degree of crystallinity, the higher the melting point of the polymer. Thus, by reducing the level of crystallinity in SPBD, its melting point is accordingly reduced.

The N,N-dibutylformamide (DBF) which is utilized as a modifier in practicing this invention has the structural formula:

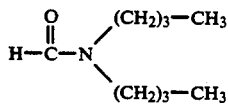

Lower N,N-dialkylformamides, such as N,N-dimethylformamide, N,N-diethylformamide, and N,N-dipropylformamide, cannot be used as modifiers in such aqueous polymerizations because they hydrolyze in the aqueous polymerization mediums in which such suspension and emulsion polymerization are conducted. The use of higher N,N-dialkylformamides is not a commercially viable option because they are not very efficient and would need to be utilized in large quantities to attain a significant melting point reduction.

In practicing this invention standard suspension or emulsion polymerization techniques are carried out in the presence of N,N-dibutylformamide as a modifier. The amount of N,N-dibutylformamide utilized will depend upon the desired melting point for the SPBD being prepared. Naturally, larger quantities of N,N-dibutylformamide result in lower melting points. Thus, if SPBD having a very low melting point is being sought, then a relatively large amount of N,N-dibutylformamide will be utilized as a modifier in the polymerization. In cases where SPBD having only a slightly reduced melting point is sought, a relatively low level of N,N-dibutylformamide will be needed.

As a general rule, the aqueous polymerization medium will contain from about 0.01 to about 2 phm (parts per hundred parts by weight of monomer) of the N,N-dibutylformamide. Usually from about 0.05 phm to about 1.25 phm of N,N-dibutylformamide will be employed. In most cases, from about 0.1 phm to about 1.0 phm of the N,N-dibutylformamide will be utilized. To attain good conversions less than about 0.5 phm and preferably less than about 0.25 phm of the N,N-dibutylformamide will be utilized. The table below shows the approximate relationship between conversion, melting point, and the amount of N,N-dibutylformamide utilized.

| Amount of N,N-dibutylformamide | Monomer Conversion | SPBD Melting Point |
|---|---|---|
| 0 | 99% | 188° C. |
| 0.25 phm | 96% | 120° C. |
| 0.50 phm | 85% | 110° C. |
| 1.00 phm | 60% | 105° C. |
| 1.25 phm | 40% | 104° C. |

SUSPENSION POLYMERIZATION

The first step in the synthesis of SPBD by suspension polymerization involves the preparation of a catalyst component solution. The catalyst component solution is prepared by dissolving at least one cobalt compound and at least one organoaluminum compound in an inert organic solvent containing at least one conjugated diene which is dissolved therein.

The term "an inert organic solvent" used herein refers to an organic solvent chemically inert to all of the catalyst components, the emulsifier, the 1,3-butadiene and the SPBD. Some representative examples of inert organic solvents include aromatic hydrocarbons, aliphatic hydrocarbons, alicyclic hydrocarbons, halogenated aromatic hydrocarbons, and mixtures of two or more of the above-mentioned compounds. Some representative examples of aromatic hydrocarbons that can be utilized include benzene, toluene, xylenes, ethylbenzene, diethylbenzene or isobutylbenzene. The aliphatic hydrocarbons which can be used include n-hexane, isohexanes, n-heptane, n-octane, isooctanes, n-decane, 2,2-dimethylbutane, petroleum ether, kerosene, petroleum spirit or petroleum naphtha. The alicyclic hydrocarbons that can be used include cyclohexane and methylcyclohexane. Some representative examples of halogenated aromatic hydrocarbons that can be used include chlorobenzene, dichlorobenzenes or trichlorobenzenes.

The cobalt compound usable for the process of the present invention is soluble in an inert organic solvent selected from the group consisting of (i) $\beta$-diketone compounds; (ii) $\beta$-keto acid ester complexes of cobalt; (iii) cobalt salts of organic carboxylic acids having 1 to 25 carbon atoms, and (iv) complexes of halogenated coblat compounds of the formula $CoX_n$ wherein X represents a halogen atom and n represents 2 or 3, with an organic compound selected from the group consisting of tertiary amines, alcohols, tertiary phosphines, ketones and N,N-dialkylamides.

The $\beta$-diketone compound which can be used to form a complex with a cobalt atom is of the formula:

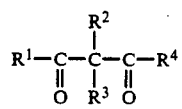

wherein $R^1$ and $R^4$, which are the same as or different from one another, are an alkyl radical of 1 to 6 carbon atoms and $R^2$ and $R^3$, which are the same as or different from one another, are a hydrogen atom or an alkyl radical having 1 to 6 carbon atoms. This type of $\beta$-diketone complex of cobalt may be cobalt (ii) acetylacetonate or cobalt (iii) acetylacetonate.

The $\beta$-keto acid ester which can be used to form a complex with a cobalt atom may be of the formula:

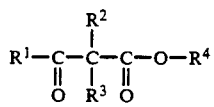

wherein $R^1$, $R^2$, $R^3$ and $R^4$ are the same as defined above. This type of cobalt complex may be a cobalt-acetoacetic acid ethyl ester complex.

Some representative examples of cobalt salts of organic carboxylic acids that can be used include cobalt octoate and cobalt naphthanate.

The organoaluminum compound usable for the process of the present invention is of the formula $AlR_3$ wherein R represents a hydrocarbon radical containing from 1 to 6 carbon atoms. The hydrocarbon radical may be an alkyl radical or a cycloalkyl radical containing from about 1 to about 6 carbon atoms. The hydrocarbon radical may also be an aryl radical. Preferably, the organoaluminum compound will be trimethylaluminum, triethylaluminum triisobutylaluminum or triphenylaluminum.

In the preparation of the catalyst component solution, it is important that the cobalt compound and the organoaluminum compound are dissolved in the inert organic solvent containing at least one conjugated diene. Some conjugated dienes that can be used in making the catalyst component solution include 1,3-butadiene, 1,3-pentadiene, isoprene and myrcene. If the preparation is carried out in the absence of a conjugated diene, the resultant catalyst component solution is not effective as a component of the catalyst composition of the present invention. The conjugated diene is preferably used in a ratio by mole of at least 5, more preferably, within the range of 10 to 100, and most preferably within the range of 15 to 30, to the amount by mole of the cobalt compound to be used in the catalyst component solution. The preferred conjugated dienes for use in this invention are 1,3-butadiene and isoprene. The most preferred polyene is 1,3-butadiene.

The catalyst component solution is preferably prepared at a temperature of −25° C. to 50° C. and preferably contains 0.0005 to 1.0 moles per liter, and more preferably 0.001 to 0.5 moles per liter of the cobalt compound. The temperature at which the catalyst component solution is prepared will more preferably be within the range of −10° C. to 10° C. and it is also highly desirable to use vigorous agitation in the preparation of the catalyst component solution. The ratio by mole of the organoaluminum compound to the cobalt compound is preferably in a range from 0.2 to 50, more preferably, within the range of from 1 to 20, and most preferably within the range of 2 to 10.

In the preparation of the catalyst component solution, it is preferred for the cobalt compound to be first dissolved in the inert organic solvent in the presence of the polyene monomer and then for the organoaluminum compound to be added to the solution. However, very satisfactory results can also be obtained when the organoaluminum compound is added first.

In the preparation of this catalyst component solution, the organoaluminum compound should not be allowed to come in contact with water. This is because water can completely decompose such organoaluminum compounds. Accordingly, it is preferable that the inert organic solvent to be used to prepare the catalyst component solution be preliminarily dehydrated at least up to a content of water which is insufficient to completely decompose a significant amount of the organoaluminum compound.

It is preferable that the catalyst component solution be prepared using a dry (essentially water free) inert organic solvent. However, a trace of water in the inert organic solvent can be present up to a concentration of about 500 ppm (parts per million by weight). It is preferred for no more than 50 ppm of water to be present in the inert organic solvent used in the preparation of the catalyst component solution. If a sufficient amount of water is present in the inert organic solvent used in the preparation of the catalyst component solution, the catalyst can be completely destroyed. The catalyst component solution will preferably be stored under an inert gas atmosphere, such as nitrogen, in the absence of sunlight or ultraviolet light.

It is desirable to allow the prereaction used in the preparation of the catalyst component solution to run for a period of at least 30 seconds, and more preferably for at least 1 minute before mixing the catalyst component solution with the oil, surfactant, and water used in making the catalyst emulsion composition. Longer time periods can be used without the catalyst component solution losing its activity. In fact, the catalyst component solution can be stored for many weeks without losing activity if stored under an inert atmosphere.

After the organoaluminum compound has been incorporated in the catalyst component solution using the above-described technique, the catalyst becomes stable to water. This is presumably because of the formation of a $\pi$-allyl cobalt active specie. It is believed that it is this $\pi$-allyl bonding to the cobalt metal atom that imparts stability to this catalyst component, possibly by providing some hydrophobic shielding of the cobalt atom from water. Stability in polar solvents are well know for $\pi$-allyl complexes of other Group VIII transition metals of the periodic table to which cobalt belongs.

In the second step of the suspension polymerization procedure, a reaction mixture is prepared by mixing the catalyst component solution with a 1,3-butadiene/water mixture. The N,N-dibutylformamide modifier will also be added to the reaction mixture in the desired amount. A partitioning agent, such as gelatin, will be included in the reaction mixture to obtain a small polymer particle size. The amount of partitioning agent to be employed will preferably be within the range of about 0.75 to about 1.5 parts by weight per 100 parts by weight of 1,3-butadiene monomer to be polymerized. This 1,3-butadiene/water mixture can contain from as little as about 2% butadiene to as much as about 50% butadiene by weight. It is preferred for this 1,3-butadiene/water mixture to contain from 15% to 35% by weight butadiene and it is more preferred for it to contain about 20 to 25% butadiene by weight. Since 1,3-butadiene is very volatile, it will be necessary to prepare this mixture in a closed system. Agitation will be provided in the preparation of the reaction mixture in order to insure formation of monomer droplets containing the catalyst component solution are distributed uniformly throughout the mixture. Since 1,3-butadiene is essentially insoluble in water, it will be present in this mixture in the form of droplets which are distributed throughout the mixture. If agitation is discontinued, there will be a separation of the organic and aqueous components of this mixture into two layers. The organic and aqueous layers of this reaction mixture can be mixed together again by agitating the reaction mixture.

In the third step of the suspension polymerization process, a polymerization mixture is prepared by adding carbon disulfide to the above-described reaction mixture. The molar ratio of carbon disulfide to 1,3-butadiene monomer will vary between about 1:600 and 1:2800. The molar ratio of carbon disulfide to monomer will preferably be within the range of about 1:1200 to about 1:1400. The molar ratio of monomer to cobalt will be within the range of 2500:1 to 10,000:1 and will preferably be within the range of 4500:1 to 5500:1.

In the final step of the suspension polymerization, the 1,3-butadiene monomer in the polymerization mixture is converted into polybutadiene while agitating the polymerization mixture. If the use of an antioxidant is desired, it may be added conveniently at the beginning of the polymerization. This polymerization of 1,3-butadiene monomer can be carried out at a temperature from about −20° C. to about 60° C. It is preferable for the polymerization temperature to be from −10° C. to 40° C. The most preferred polymerization temperature is about 0° C. to 10° C. At temperatures below 0° C., an agent which will lower the freezing point of water can be added to the polymerization mixture to keep it from freezing.

This polymerization can be carried out either under a normal pressure or in a pressurized system. This polymerization can be carried out under a nitrogen atmosphere with good results. Such a polymerization can be run for a period of from about 1 to about 30 hours. It is generally preferred for the polymerization to be run for about 8 to about 10 hours. However, the optimum polymerization time will vary greatly with the polymerization temperature, catalyst, the amount of catalyst used, etc. The polybutadiene formed using the process of this invention will float to the surface of the polymerization mixture and can easily be recovered.

EMULSION POLYMERIZATION

In cases where SPBD is made by emulsion polymerization, a catalyst component solution is made utilizing the same techniques that are employed in making catalyst component solutions for suspension polymerizations. Then, a catalyst emulsion composition is prepared by microfluidizing or microemulsifying the catalyst component solution with an oil, a surfactant and water. In preparing the catalyst emulsion composition, it is highly desirable to first mix the catalyst component solution with the oil and to separately mix the surfactant with the water. The catalyst component solution/oil mixture is then subsequently mixed with the surfactant/water mixture immediately prior to the microfluidization. The ratio of oil to catalyst component solution will normally be within the range of about 0.5 to 30. It is normally preferred for the ratio of oil to catalyst component solution to be within the range of about 1 to about 10 and it is typically most preferred for the oil to catalyst component solution ratio to be within the range of about 2 to about 3. For example, a weight ratio of oil to catalyst component solution of about 2.5:1 is highly preferred.

The weight ratio of water to catalyst component solution utilized in preparing the catalyst emulsion composition is typically within the range of about 5 to about 80. It is normally preferred for the weight ratio of water to catalyst component solution to be within the range of about 10 to about 50. In most cases it will be more preferred for the weight ratio of water to catalyst component solution utilized in preparing the catalyst emulsion composition to be within the range of about 20 to about 30. For instance, a weight ratio of water to catalyst component solution of about 27:1 is highly preferred for utilization in preparing the catalyst emulsion compositions of this invention. The weight ratio of surfactant to catalyst component solution utilized in preparing the catalyst emulsion composition will typically be within the range of about 0.001 to about 10. In most cases it will be preferred to utilize a weight ratio of surfactant to catalyst component solution which is within the range of about 0.05 to 5. It is typically more preferred to utilize a ratio of surfactant to catalyst component solution which is within the range of about 0.1 to 0.3. Accordingly, a weight ratio of surfactant to catalyst component solution of about 0.2:1 is highly preferred.

The oil utilized in preparing the catalyst emulsion composition will typically be a long chain paraffinic oil. Such oils will generally be mixtures of various long chain hydrocarbons which contain from about 12 to about 28 carbon atoms. It is generally preferred for these compounds to be saturated. The oil will preferably be comprised of hydrocarbon compounds which contain from about 12 to about 18 carbon atoms. It is possible to utilize long chain alcohols which contain from about 12 to about 28 carbon atoms as the oil. The utilization of such alcohols results in the SPBD being synthesized having a lower melting point. It is, accordingly, desirable to use such alcohols as the oil if SPBD having a low melting point is desired. On the other hand, if SPBD having a high melting point is sought, then it will not be desirable to utilize alcohols as the oil. It is, of course, also possible to utilize a combination of paraffinic oils and alcohols to adjust the melting point of the SPBD as desired.

The surfactant utilized in preparing the catalyst emulsion composition will normally be an anionic surfactant or a nonionic surfactant. Some representative examples of types of anionic surfactants which can be utilized include carboxylates, alkylbenzene sulfonates, alkane sulfonates, α-olefin sulfonates, fatty alcohol sulfates, and oxo-alcohol sulfates. Some representative examples of types of nonionic surfactants which can be utilized include alkylphenol ethoxylates, fatty-alcohol polyethyleneglycol ethers, oxo-alcohol polyethyleneglycol ethers, ethylene oxide polymers, propylene oxide polymers, and fatty alcohol polyglycol ethers. It is generally preferred for the surfactant to be an anionic surfactant with alkyl benzene sulfonates, fatty alcohol sulfates, and oxo-alcohol ether sulfates being most preferred. The alkyl benzene sulfonates which are utilized generally have the structural formula:

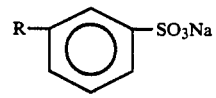

wherein R represents an alkyl group containing from 8 to 18 carbon atoms and preferably wherein R represents an alkyl group containing from 10 to 13 carbon atoms. The fatty alcohol sulfates which can be utilized normally have the structural formula:

wherein R represents an alkyl group containing from 6 to 28 carbon atoms and preferably wherein R represents an alkyl group containing from 11 to 17 carbon atoms. The oxo-alcohol ether sulfates which can be utilized generally have the structural formula:

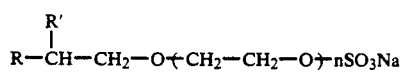

wherein n is an integer from 1 to about 4 and wherein R and R' represent alkyl groups which can be the same or different with the total number of carbon atoms in R and R' ranging from about 11 to about 13.

The microfluidization procedure utilized results in the formation of a catalyst emulsion composition which has an average particle size which is within the range of about 10 to about 1,000 nanometers. The catalyst emulsion composition prepared will preferably have an average particle size which is within the range of about 30 to about 600 nanometers and will more preferably have an average particle size which is within the range of about 60 to about 300 nanometers. This microfluidization procedure can be carried out utilizing conventional microfluidizers or other equipment which is capable of homogenizing the catalyst emulsion composition to the desired particle size. For instance, the microfluidization can be carried out utilizing a high pressure pump or series of pumps. Ultrasonic and/or mechanical means can be utilized in the microfluidization procedure. To attain the desired particle size, it may be advantageous to pass the catalyst emulsion composition which is being prepared through the Microfluidizer ™ more than one time.

The catalyst component solution utilized in preparing the catalyst emulsion composition is stable over long periods of time and can be stored for long periods without losing its activity. However, it is highly desirable to utilize the catalyst emulsion composition as soon as possible after it is prepared because the catalyst emulsion composition loses its activity over time. In practice, standard catalyst emulsion compositions lose essentially all of their activity after about 24 hours of being stored at room temperature. It is, accordingly, important to use the catalyst emulsion composition as soon as possible after its preparation. However, it has been unexpectedly found that the stability of the catalyst emulsion composition can be greatly improved if it is made with an amino acid soap. In fact, catalyst emulsion compositions which exhibit good activity for 24 hours can be made utilizing amino acid soaps. The amino acid soaps which can be utilized are generally salts of alkyl sarcosines. The alkyl groups in such alkyl sarcosines generally contain from about 8 to about 20 carbon atoms. These salts can be made by neutralization of the alkyl sarcosine with a base such as sodium, potassium, ammonium hydroxide, monoethanolamine, diethanolamine, triethanolamine or the like. Some representative examples of amino acid soaps which can be used include, sodium lauryl sarcosinate, sodium cocoyl sarcosinate, sodium myristoyl sarcosinate, sodium oleoyl sarcosinate, and sodium stearoyl sarcosinate. In most cases, sodium lauroyl sarcosinate will be used as the amino acid soap.

The aqueous reaction mixture is prepared by mixing (1) water, (2) at least one emulsifier, (3) 1,3-butadiene monomer, (4) the catalyst emulsion composition, (5) carbon disulfide and (6) the N,N-dibutylformamide modifier. Water is the major component in the aqueous reaction mixture. The amount of 1,3-butadiene monomer in the aqueous reaction mixture will vary from about 2 weight percent to about 50 weight percent. However, in most cases it will be preferred for the aqueous reaction mixture to contain from about 10 weight percent to about 40 weight percent 1,3-butadiene monomer. It will generally be more preferred for the aqueous reaction mixture to contain from about 20 to about 30 weight percent 1,3-butadiene monomer. The amount of emulsifier utilized in preparing the aqueous reaction mixture will normally be within the range of about 0.1 phm to about 10 phm (parts per hundred parts of monomer). It will normally be preferred for the emulsifier to be present in an amount ranging from about 0.5 phm to about 5 phm. In most cases, it will be more preferred for the emulsifier to be present in an amount within the range of about 1 phm to about 3 phm.

The emulsifiers used in the emulsion polymerization of 1,3-butadiene into SPBD may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization.

Among the anionic emulsifiers that can be employed in such emulsion polymerizations are fatty acids and their alkali metal soaps such as caprylic acid, capric acid, pelargonic acid, lauric acid, undecyclic acid, myristic acid, palmitic acid, margaric acid, stearic acid, arachidic acid, and the like; amine soaps of fatty acids such as those formed from ammonia, mono- and dialkyl amines, substituted hydrazines, guanidine and various low molecular weight diamines; chain-substituted derivatives of fatty acids such as those having alkyl substituents; naphthenic acids and their soaps and the like; sulfuric esters and their salts, such as the tallow alcohol sulfates, coconut alcohol sulfate, fatty alcohol sulfates, such as oleyl sulfate, sodium lauryl sulfate and the like; sterol sulfates; sulfates of alkylcyclohexanols, sulfation products of lower polymers of ethylene as C10 to C20 straight chain olefins, and other hydrocarbon mixtures, sulfuric esters of aliphatic and aromatic alcohols having intermediate linkages, such as ether, ester, or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC$—$CH_2$—$SO_3H$, wherein R is an alkyl group having from 1 to 20 carbon atoms such as dialkyl sulfosuccinates; ester salts with the general formula:

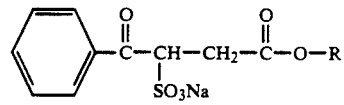

wherein R is an alkyl group having from 1 to 20 carbon atoms; alkylaryl sulfonates in which the alkyl groups contain preferably from 10 to 20 carbon atoms, e.g. dodecylbenzenesulfonates, such as sodium dodecylbenzene sulfonate; alkyl phenol sulfonates; sulfonic acids and their salts such as acids with the formula $RSO_3Na$, wherein R is an alkyl and the like; sulfonamides; sulfamido methylenesulfonic acids; rosin acids and their soaps; sulfonated derivatives of rosin and rosin oil; and lignin sulfonates, and the like.

Carboxylate emulsifiers are highly preferred. This is because their utilization leads to less build-up on the walls of the polymerization reactor. Fatty acid soaps and rosin acid soaps are representative examples of highly preferred carboxylate soaps. Of rosin acids, about 90 percent are isometric with abietic acid and the other 10 percent is a mixture of dehydro abietic acid and dihydro abietic acid.

Agitation should be provided in the preparation of the aqueous reaction mixture to ensure that the catalyst emulsion composition, the monomer, and the surfactant are distributed essentially homogeneously throughout the mixture. Since 1,3-butadiene monomer is very volatile, it will be necessary to prepare the aqueous reaction mixture under pressure in a closed system.

The carbon disulfide is typically the last component to be added to the aqueous reaction mixture. The addition of carbon disulfide to the reaction mixture which already contains the catalyst emulsion composition will initiate the polymerization reaction. The amount of carbon disulfide that can be added will vary between 0.005 phm and 2 phm. More preferably, the amount of carbon disulfide added will vary between 0.001 and 1 phm.

In the process of the present invention, the larger the proportion of the carbon disulfide in a range from about 0.0005 phm to about 0.5 phm in the polymerization mixture, the larger the yield of the SPBD obtained from the polymerization mixture. However, too large an amount of carbon disulfide, for example, larger than about 0.5 phm, causes a decrease in the polymer yield.

The 1,3-butadiene monomer is polymerized into SPBD while agitating the polymerization mixture. If the use of an antioxidant is desired, it may be added conveniently at the beginning of the polymerization. This polymerization of 1,3-butadiene monomer can be carried out at a temperature from about −20° C. to about 90° C. It is preferable for the polymerization temperature to be from −10° C. to 40° C. The most preferred polymerization temperature is about 0° C. to about 10° C. At temperatures below 0° C., an antifreeze agent can be added to the polymerization mixture to keep it from freezing.

This polymerization can be carried out either under a normal pressure or in a pressurized system. This polymerization can be carried out under an inert gas atmosphere, such as a nitrogen atmosphere, with good results. Such a polymerization can be run for a period of from about 3 to about 30 hours. It is generally preferred for the polymerization to be run for a period which is within the range of about 10 to 16 hours. However, the optimum polymerization time will vary greatly with the polymerization temperature, catalyst, the amount of catalyst used, etc. In most cases, the optimum polymerization time will be within the range of about 12 to about 14 hours.

After the polymerization has been completed, the SPBD can be recovered from the latex by standard coagulation techniques. For instance, coagulation can be accomplished by adding acids or blends of salts with acids to the latex. For example, sulfuric acid, hydrochloric acid, blends of sodium chloride with sulfuric acid and blends of hydrochloric acid with methanol are very effective as coagulating agents. Calcium chloride solutions and blends of calcium chloride with various acids can also be utilized as coagulants. Salt/acid coagulants are generally preferred. For instance, the utilization of sulfuric acid with sodium chloride or potassium chloride as the coagulant will lead to good results. Barium chloride and magnesium sulfate are additional examples of divalent salts which are suitable for utilization in coagulating the SPBD latex. It may also be advantageous to employ materials classified as coagulation aids, such as high molecular weight polyelectrolytes, in the coagulation of the SPBD latex. The preferred coagulation aids are weak bases. Some representative examples of suitable coagulation aids which can be used include Nalco TM 108 (Nalco Chemical Company), Daxad TM CP-1 (W. R. Grace and Company), and similar materials that are also weakly basic polyelectrolytes. The quantity of coagulant required will vary with the emulsifier, the amount of emulsifier used, the rubber being coagulated, and the type of coagulant being employed. Generally, the optimum type of coagulant, quantity of coagulant and coagulating conditions can be determined using a trial and error approach.

The following working examples illustrate various embodiments of the process of the present invention. These examples are intended merely to illustrate the present invention and not in any sense to limit the scope in which the present invention can be practiced. Unless specifically indicated otherwise, parts and percentages are given by weight.

EXAMPLES 1-12

In this series of experiments latices of SPBD were prepared with various compounds being evaluated as agents for reducing the melting point of the SPBD. In Examples 1 and 2 N,N-dibutylformamide was evaluated. Examples 3-12 are comparative examples where other compounds were evaluated. The first step of the procedure utilized involved making the catalyst component solution. This was done by charging 7.3 lbs. (3.3 kg) of hexane to a reactor which had been evacuated for 30 minutes. Then 0.61 lbs. (0.28 kg) of cobalt octoate was added with the mixture being agitated. Then 1.3 lbs. (0.59 kg) of 1,3-butadiene was added. After that 3.5 lbs. (1.59 kg) of triethylaluminum was added with the agitation being continued. Cooling was also utilized to keep the temperature of the mixture below about 70° F. (21° C.). After all of the triethylaluminum had been added and the temperature fell below 50° F. (10° C.). The catalyst component solution which has been prepared was transferred to a clean plastic 5 gallon (18.9 liter) carboy for storage in a cold room until needed. The catalyst component solution was additionally stored under a blanket of nitrogen in the absence of light.

A mixture of the catalyst component solution with a paraffinic oil was then prepared. This was done by mixing 150 grams of the catalyst component solution with 150 grams of a paraffinic process oil. A surfactant solution was also prepared. This was done by mixing 1500 grams of water with 75 grams of Hamposyl ® L30 sodium lauroyl sarcosinate. The mixture of the oil with the catalyst component solution was then microfluidized with the surfactant solution. This was done in a homogenizer unit made by Microfluidics Corporation. Mixing of the aqueous and organic phases was accomplished utilizing a mixing Tee just ahead of the Microfluidizer SM pump. The homogenization process was continued until an average particle size for the catalyst emulsion composition of about 100 nanometers was attained.

Buffer solutions were prepared by mixing 250 grams of water with 2.5 grams of a potassium salt of a tallow fatty acid, 25 grams of a sodium salt of a rosin acid, and the "modifier" shown in Table I. The buffer solutions were then added to quart (946 ml) polymerization bottles. Then 235 grams of the microfluidized catalyst component solution and 125 grams of 1,3-butadiene were charged into each of the polymerization bottles. Subsequently, 6.25 grams of a carbon disulfide emulsion was charged into the polymerization bottles to initiate the polymerizations. The carbon disulfide emulsions were made by mixing and stirring 1.5 grams of carbon disulfide, 1 gram of Triton ® N-42 surfactant, 15 grams of hexane, and 45 grams of water.

The polymerizations were carried out at a temperature of about 50° F. (10° C.) for a period of about 8 hours. Stable SPBD latices were produced. The SPBD made in each example was recovered with yields, melting points, and glass transition temperatures (Tg) being determined. Table I shows the yield attained and the melting point of the SPBD recovered.

TABLE I

| Example | Modifier | Modifier Level | Yield | SPBD Melting Point | Tg |
| --- | --- | --- | --- | --- | --- |
| 1 | N,N-dibutylformamide | 0.625 g | 95% | 119° C. | −29° C. |
| 2 | N,N-dibutylformamide | 0.25 g | 97% | 141° C. | −15° C. |
| 3 | N,N-dibutylformamide | 0.625 g | 15% | 117° C. | −28° C. |
| 4 | N,N-dibutylformamide | 0.25 g | 26% | 144° C. | −23° C. |
| 5 | diethylfumarate | 0.625 g | <5% | — | — |
| 6 | diethylfumarate | 0.625 g | <5% | — | — |
| 7 | dibutylitaconate | 0.625 g | <5% | — | — |
| 8 | dibutylitaconate | 0.25 g | <5% | — | — |
| 9 | dibutylfumarate | 0.625 g | 15% | 144° C. | — |
| 10 | dibutylfumarate | 0.25 g | 22% | 149° C. | — |
| 11 | diphenylformamide | 0.625 g | 37% | 156° C. | — |
| 12 | diphenylformamide | 0.25 g | 47% | 168° C. | — |

As can be seen from Table I, the N,N-dibutylformamide reduced the melting of the SPBD produced in Example 1 to less than 120° C. with the yield still being greater than 95%. The N,N-dimethylformamide used in Examples 3 and 4 reduced the melting point of the SPBD produced greatly. However, the use of N,N-dimethylformamide caused yields to be very poor. The yields achieved when diethylfumarate and dibutylitaconate were used as modifiers were less than 5%.

While certain representative embodiments and details have been shown for the purpose of illustrating the subject invention, it will be apparent to those skilled in this art that various changes and modifications can be made therein without departing from the scope of this invention.

What is claimed is:

1. A process for preparing syndiotactic 1,2-polybutadiene having a melting point of less than about 195° C. which comprises: polymerizing 1,3-butadiene monomer in an aqueous medium in the presence of (1) a catalyst composition which is made by reacting (a) at least one cobalt compound selected from the group consisting of (i) β-diketone complexes of cobalt, (ii) β-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, (b) at least one organoaluminum compound of the formula $AlR_3$, wherein R represents a hydrocarbon radical of 1 to 6 carbon atoms and (c) at least one conjugated diene; (2) carbon disulfide; and (3) N,N-dibutylformamide.

2. A process as specified in claim 1 wherein said process is a suspension polymerization process.

3. A process as specified in claim 1 wherein said process is an emulsion polymerization process.

4. A process as specified in claim 1 wherein said polymerization is carried out at a temperature which is within the range of about −10° C. to about 40° C.

5. A process as specified in claim 1 wherein said polymerization is carried out at a temperature which is within the range of about 0° C. to about 10° C.

6. A process as specified in claim 1 wherein the N,N-dibutylformamide is present at a concentration which is within the range of about 0.01 phm to about 2 phm.

7. A process as specified in claim 1 wherein the N,N-dibutylformamide is present at a concentration which is within the range of about 0.05 phm to about 1.25 phm.

8. A process as specified in claim 1 wherein the N,N-dibutylformamide is present at a concentration which is within the range of about 0.1 phm to about 1.0 phm.

9. A process as specified in claim 1 wherein the N,N-dibutylformamide is present at a concentration which is within the range of about 0.1 phm to about 0.5 phm.

10. A process as specified in claim 1 wherein the N,N-dibutylformamide is present at a concentration which is within the range of about 0.1 phm to about 0.25 phm.

11. A process as specified in claim 3 wherein the catalyst composition is in a catalyst emulsion composition which was prepared by microfluidizing or microemulsifying a catalyst component solution with an oil, an amino acid soap, and water.

12. A process as specified in claim 11 wherein the amino acid soap is a salt of an alkyl sarcosine.

13. A process as specified in claim 11 wherein the amino acid soap is sodium lauroyl sarcosinate.

14. A process as specified in claim 11 wherein the catalyst component solution is prepared by dissolving at least one cobalt compound and at least one organoaluminum compound in an inert organic solvent containing at least one conjugated diene.

* * * * *